US012681864B1

(12) United States Patent
Sahasrabudhe et al.

(10) Patent No.:  US 12,681,864 B1
(45) Date of Patent:      Jul. 14, 2026

(54) LOCAL STORAGE NODE PERFORMANCE ENHANCEMENT

(71) Applicant: Dell Products L.P., Round Rock, TX (US)

(72) Inventors: Kaustubh Sahasrabudhe, Westborough (MA); Ramesh Doddaiah, Westborough, MA (US); Steve Ivester, Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/021,498

(22) Filed: Jan. 15, 2025

(51) Int. Cl.
*G06F 12/00* (2006.01)
*G06F 12/0891* (2016.01)

(52) U.S. Cl.
CPC ................................ *G06F 12/0891* (2013.01)

(58) Field of Classification Search
CPC .................................................. G06F 12/0891
See application file for complete search history.

(56) References Cited

U.S. PATENT DOCUMENTS

| | | | | |
|---|---|---|---|---|
| 2013/0290643 A1* | 10/2013 | Lim | .................. | G06F 16/24552 |
| | | | | 711/144 |
| 2016/0246733 A1* | 8/2016 | Condict | .............. | H04L 67/1097 |
| 2024/0205165 A1* | 6/2024 | Smith | .................... | H04L 41/16 |

\* cited by examiner

*Primary Examiner* — Craig S Goldschmidt
(74) *Attorney, Agent, or Firm* — DALY, CROWLEY, MOFFORD & DURKEE, LLP

(57) ABSTRACT

Disclosed are systems and methods for enhancing local node performance in a storage system through offloading cache replacement tasks to remote nodes. A periodic time-series analysis of CPU cycle utilization and network latency is conducted on one or more arrays to identify and/or forecast underutilized nodes in the one or more arrays. A first array detects a shortage of available cache slots in an allocation queue and identifies underutilized remote nodes in either its own array or another array. The array shares the metadata pages with the remote node. A worker thread on the remote node runs a search algorithm on the received meta data pages and creates a list of candidate replacement memory slots.

20 Claims, 6 Drawing Sheets

LOCAL STORAGE NODE PERFORMANCE ENHANCEMENT

BACKGROUND

A distributed storage system may include a plurality of networked storage devices to provide data storage to a plurality of arrays. The plurality of storage devices and the plurality of arrays may be situated in the same physical location, or in one or more physically remote locations. The plurality of nodes and arrays may be coupled to the storage devices by a high-speed interconnect, such as a switch fabric.

Cache replacement policies or tasks include optimizing instructions or algorithms to manage a cache of information. Caching improves performance by keeping recent or often-used data items in memory locations which are faster, or computationally cheaper to access, than normal memory stores. When the cache is full, the algorithm must choose which items to discard to make room for new data (i.e., cache replacement tasks).

Multi-node arrays consist of physical DRAM on each node, pooled together and presented as logical global memory for caching read and write operations. The physical fragmentation of memory across nodes makes it difficult to maintain a true Least Recently Used (LRU) cache replacement algorithm in the context of Input/Output (I/O) operations due to the high cost of accessing cache metadata over the fabric interconnect. Most enterprise multi-node arrays rely on background worker threads to execute their cache page/slot replacement algorithms. When CPU resources are insufficient for these worker threads, the system experiences a shortage of "free" cache pages, leading to significant I/O stalls or delays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method may include collecting usage data from one or more storage devices in one or more storage arrays and forecasting a network latency based on the usage data of the one or more storage devices. The forecasted network latency may be compared to a predefined threshold. A remote storage device may be selected from the one or more storage devices when the forecasted network latency is below the predefined threshold. A list of replacement memory slots may be received from the remote storage device and cache replacement tasks may be offloaded from the first storage device to the remote storage device.

According to another aspect, a system may include a memory, and a processor configured to perform the operations of collecting usage data from one or more storage devices in one or more storage arrays and forecasting a network latency based on the usage data of the one or more storage devices. The forecasted network latency may be compared to a predefined threshold. A remote storage device may be selected from the one or more storage devices when the forecasted network latency is below the predefined threshold. A list of replacement memory slots may be received from the remote storage device and cache replacement tasks may be offloaded from the first storage device to the remote storage device.

According to another aspect, a non-transitory computer-readable medium may store one or more processor-executable instructions, which when executed by a processing circuitry, further causes the processing circuitry to perform the operations of collecting usage data from one or more storage devices in one or more storage arrays and forecasting a network latency based on the usage data of the one or more storage devices. The forecasted network latency may be compared to a predefined threshold. A remote storage device may be selected from the one or more storage devices when the forecasted network latency is below the predefined threshold. A list of replacement memory slots may be received from the remote storage device and cache replacement tasks may be offloaded from the first storage device to the remote storage device.

The methods, systems and non-transitory computer-readable media may further include, alone or in combination, one or more of the following features. Forecasting the network latency may include using a time series analysis model. The time series analysis model may be an autoregressive integrated moving average (ARIMA) model. The first storage device and the remote storage device may be within a first storage array. All cache replacement tasks may be offloaded to the remote storage device, in which the list of replacement memory slots includes processed slots. The cache replacement tasks may include fabric operations. The first storage device may be within a first storage array and the remote storage device may be within a second storage array. Offloading the cache replacement tasks may include offloading a portion of the cache replacement tasks and the list of replacement memory slots includes a list of candidate replacement slots. A list of replacement memory slots may be generated by a least recently used search. Metadata pages may be transmitted to the remote storage device.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
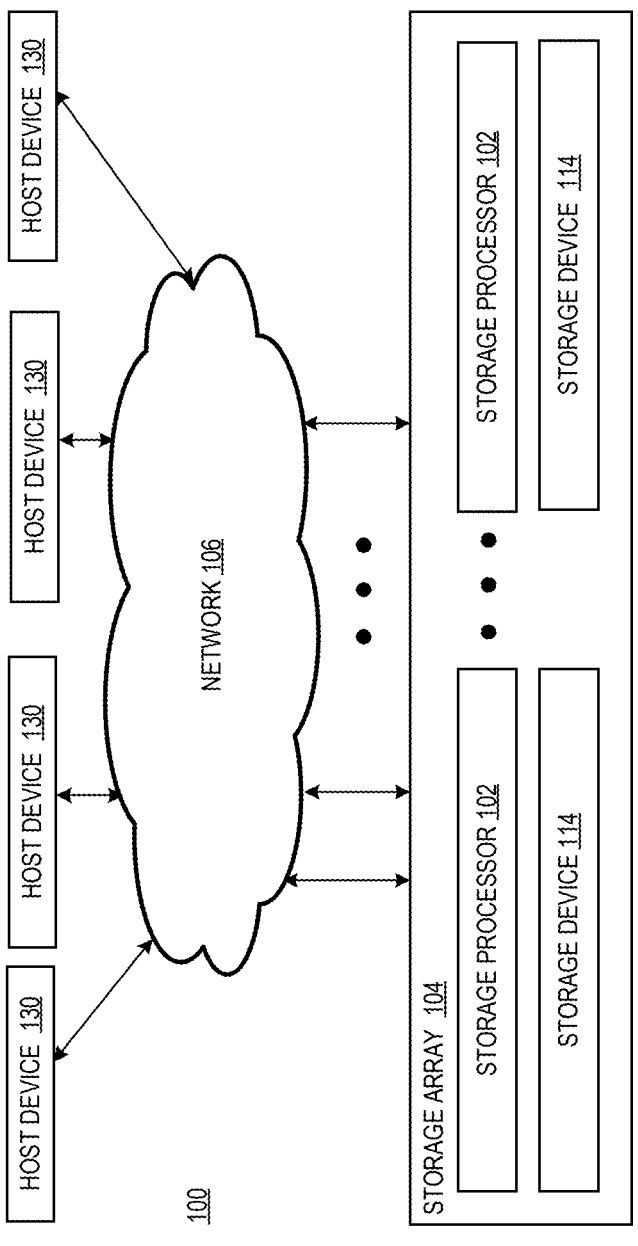
FIG. 1 is a block diagram of an illustrative storage system, according to aspects of the present disclosure.

FIG. 1 is a diagram of an example of a storage system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include or be arranged with one or more node-pairs and a plurality of non-volatile memory storage devices 114. The storage devices may be configured in a RAID-1 configuration with corresponding mirrored memories. Each node of the node pairs may include one or more storage processors 102. Each of the storage processors 102 may be configured to receive Input/ Output (I/O) requests from host devices 130 and execute the received I/O requests by reading and/or writing data to storage devices 114. Each of the host devices 130 may include a desktop computer, a laptop, a smartphone, an internet-of-things (IOT) device, and/or any other suitable type of computing device.

According to one aspect, each of storage devices 114 may be a non-volatile memory express (NVMe) drive. In another aspect, the storage devices may be solid-state drives (SSD). In some implementations, each of the storage devices 114 may be connected to the storage processors 102 via a Peripheral Component Interconnect Express (PCIe) connection. Each of the storage devices 114 may include a respective controller (not shown) and storage medium (not shown). The controller of each storage device 114 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

Figure 2A:
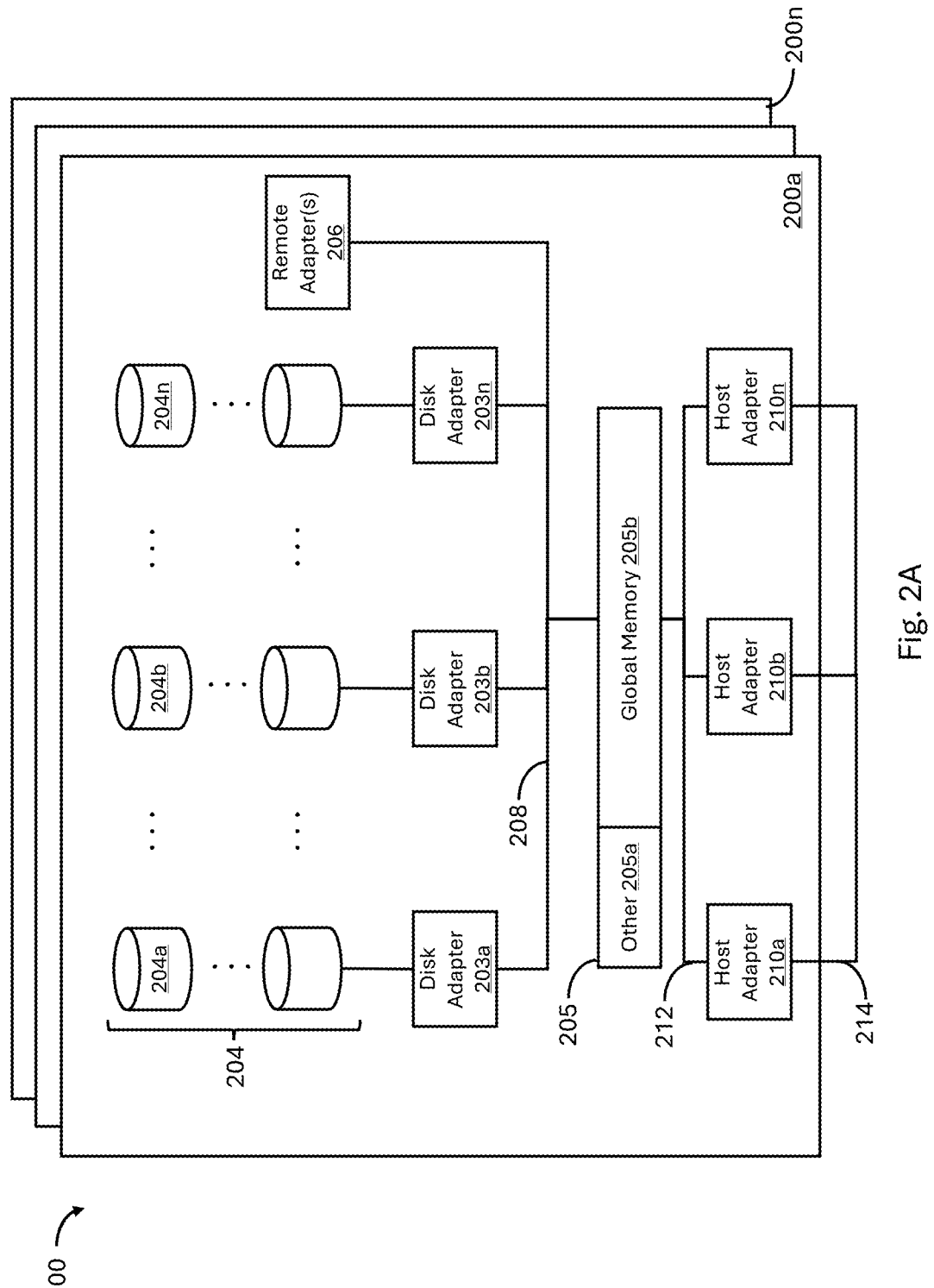
FIG. 2A is a block diagram of an example storage device, according to aspects of the present disclosure.

Referring to FIG. 2A, shown is an example of an embodiment of a storage array 200. Storage array 200 may be the same or substantially similar to the storage array 104 of FIG. 1. Included in the storage array 200 may be one or more arrays 200a-200n. Each of the arrays 200a-200n may be inter-connected (not shown). Additionally, the arrays 200a-200n may also be connected to host systems through any one or more communication connections 214 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the storage arrays 200. While this example, as described in more detail in following paragraphs, references the more detailed view of storage array 200a, it should be noted that a similar more detailed description may also apply to any one or more of the other elements, such as 200n, but have been omitted for simplicity of explanation. Each of arrays 200a-200n may be resources included in an embodiment of the system 100 of FIG. 1 to provide storage services to, for example, host computer systems. It should be noted that the storage arrays 200 may operate as stand-alones or may also be included as part of a storage area network (SAN) that includes, for example, other components.

Each of the storage arrays, such as array 200a, may include a plurality of disk devices or volumes, such as the arrangement 204 including n groupings of disks or more generally, data storage devices, 204a-204n. In this arrangement, each of the n groupings of disks may be connected to a disk adapter 203a-203n ("DA") or director responsible for the backend management of operations to and from a portion of the disks 204. In the system 200a, a single DA, such as DA 203a, may be responsible for the management of a grouping of disks, such as grouping 204. According to one aspect, a backend DA may also be referred to as a disk controller. The DA may perform operations such as reading data from, and writing data to, the physical devices (e.g., physical storage devices also referred to as PDs) which are serviced by the DA.

Also shown in the storage array 200a is a remote adapter (RA) 206. The RA 206 may be hardware including a processor used to facilitate communication between data storage systems, such as between two of the same or different types of data storage systems.

The storage array 200a may also include one or more host adapters ("HAs") or directors 210a-210n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. According to one aspect, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and memory 205. An embodiment, for example, may use one or more internal buses and/or communication modules. For example, a global memory portion 205b may be used to facilitate data transfers and other communications between the DAs, HAs and RAs in a data storage system. In one embodiment, the DAs 203a-203n may perform data operations using a cache that may be included in the global memory 205b, for example, in communications with other disk adapters or directors, and other components of the storage array 200a. The other memory portion 205a may be used in connection with other designations that may vary in accordance with each embodiment.

The storage array 200a as described herein, or a particular device thereof, such as a disk, should not be construed as a limitation. Other types or configurations of data storage systems, as well as processors and hardware controlling access to these particular devices, may also be included in an embodiment.

According to one aspect of the present disclosure, host systems provide data and access control information through channels to the storage systems, and the storage arrays and storage systems may also provide data to the host systems also through the channels. The host systems may not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

According to one aspect, the DA may perform I/O operations on a disk drive. Data residing on a disk drive may be accessed by the DA following a data request in connection with I/O operations that other directors originate. It should also be noted that a DA may also be a controller providing access to external physical drives or storage devices located on one or more external data storage systems rather than local physical drives located in the same physical storage system as the DA (such as illustrated in FIG. 2A).

Figure 2B:
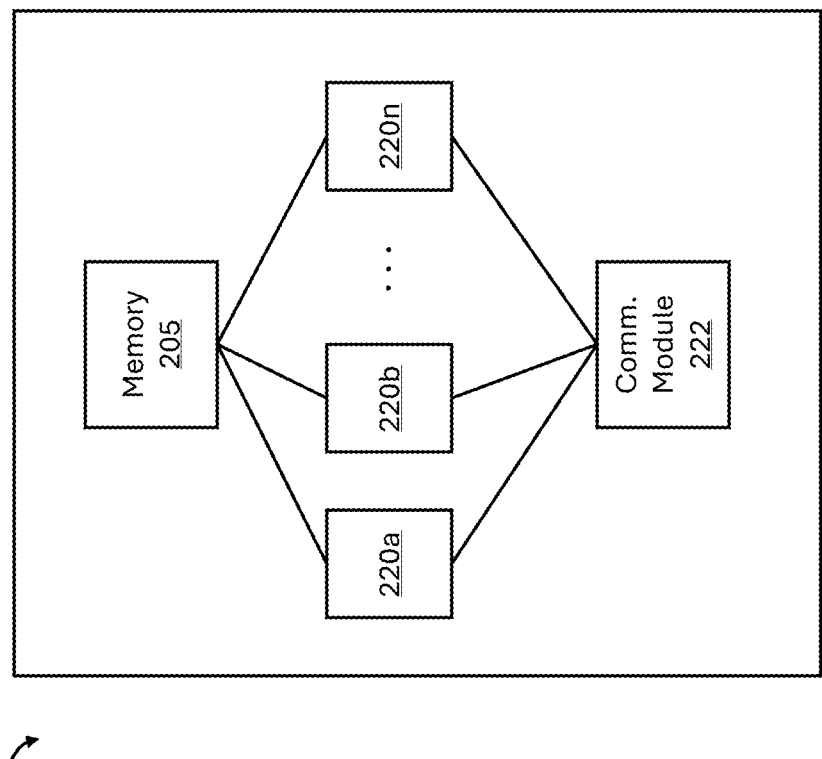
FIG. 2B is a block diagram of a representation of logical internal communications between directors and memory of a storage system, according to aspects of the present disclosure.

Referring to FIG. 2B, shown is a representation of the logical internal communications between the directors and memory included in a storage array, for example array 200a. The array 200a may include a plurality of directors 220a-220n coupled to the memory 205. Each of the directors 220a-220n may represent one of the HAs, RAs, or DAs that may be included in an array. Each of the directors may be, for example, a processor or a printed circuit board that includes a processor and other hardware components. In an embodiment disclosed herein, there may be up to sixteen directors coupled to the memory 205. Other embodiments may use a higher or lower maximum number of directors that may vary. For example, an embodiment in accordance with techniques described herein may support up to one hundred twenty-eight directors per data storage array. The representation of FIG. 2B also includes an optional communication module 222 that may provide an alternative communication path between the directors 220a-220n. Each of the directors 220a-220n may be coupled to the communication module 222 so that any one of the directors 220a-220n may send a message and/or data to any other one of the directors 220a-220n without needing to go through the memory 205.

The communication module 222 may be implemented using conventional MUX/router technology where a sending one of the directors 220a-220n provides an appropriate address to cause a message and/or data to be received by an intended receiving one of the directors 220a-220n. In addition, a sending one of the directors 220a-220n may be able to broadcast a message to all of the other directors 220a-220n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

Aspects of the present disclosure provide concepts, techniques and structures for enhancing local storage node performance through the offloading of cache replacement tasks to remote nodes. As used and described herein, remote nodes may include nodes, boards, processors of the like, within the same storage array or located in a separate array.

As is known in the art, multi-node arrays may include physical DRAM on each node that is pooled together and presented as logical global memory for caching read and write operations. The physical fragmentation of memory across nodes, however, makes it difficult to maintain a true Least Recently Used (LRU) cache replacement algorithm in an I/O context due to the high cost of accessing cache metadata over the fabric interconnect. Known enterprise multi-node arrays rely on background worker threads to execute their cache page/slot replacement algorithms. These worker threads, however, are CPU-intensive because they must access cache metadata (fragmented across the system's physical DRAMs) and run sorting algorithms to implement cache replacement tasks.

Caching algorithms may produce a queue of "prepared" or "free" cache pages (e.g. slots) that are used for incoming read and write operations. Cache threads may be constrained to a strict time limit, for example 100-milliseconds, to complete this task per extent across thousands of cache banks according to some aspects. When CPU resources are insufficient for the worker threads, the system may experience a shortage of "free" cache pages, leading to significant I/O stalls or delays. Further, imbalanced CPU cycle utilization across boards within an array, and/or between two arrays (e.g., replicated storage arrays of a remote data facility (RDF)) can intensify these issues.

Accordingly, described herein are concepts, techniques and structures for enhancing node performance in a storage system by offloading cache replacement tasks to a remote and, according to one aspect, underutilized node. According to one aspect, an enterprise storage array may be connected to at least one other array in a synchronous replication topology, including for example a remote data facility, for disaster recovery or to respond to other catastrophic failures.

When one node in the topology experiences a CPU resource shortage due to heavy workloads, other nodes (in the same array or in a second array) may have excess CPU resources that may be leveraged to perform cache replacement tasks and other operations.

For example, as described herein, a periodic time-series analysis of CPU cycle utilization and network latency may be conducted to identify and/or forecast underutilized nodes in one or more arrays. If a first array, for example an array R1, detects a shortage of "free" or available cache slots in an allocation queue, the array may identify underutilized remote nodes in either array R1 or in a second array, for example array R2. Array R1 may share the metadata pages (e.g., control slots) with the underutilized node (i.e., the remote node). A worker thread on the remote node may run a search algorithm, such as a least recently used (LRU) algorithm on the received pages and create a list of candidate replacement memory slots. The list of candidate replacement memory slots may be returned to the first array. According to one aspect, if the remote node is part of the first array (e.g., array R1), all cache replacement tasks and fabric operations may be offloaded to the remote node. If the remote node is in a second array (e.g., array R2) a percentage of the cache replacement tasks may be offloaded.

Figure 3:
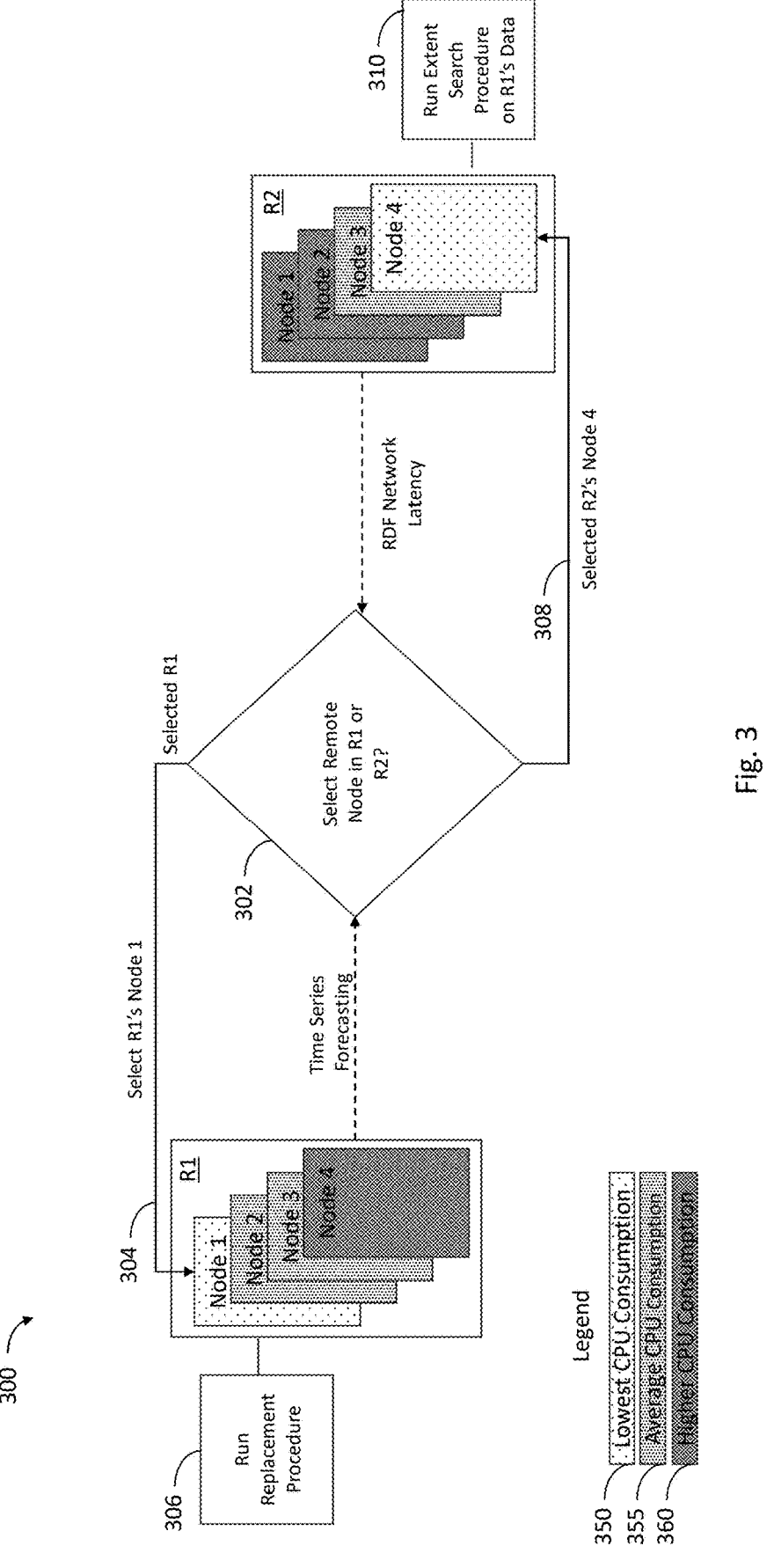
FIG. 3 is a flow diagram of an exemplary architecture of an enhanced cache replacement task system, according to aspects of the present disclosure.

FIG. 3 is a flow diagram of an exemplary architecture 300 of an enhanced cache replacement task system, according to aspects of the present disclosure. The architecture may include a number of arrays, such as a first array R1 and a second array R2. According to one aspect, arrays R1 and R2 may be duplicate arrays according to an RDF. Each of array R1 and R2 may include a number of nodes, such as Nodes 1-4, respectively.

Each of Nodes 1-4 may be or include a CPU consumption level indicative of the workload each Node is undergoing at a particular time. According to one aspect, the nodes may be classified according to three CPU consumption levels, including for example, a lowest consumption level 350, an average consumption level 355, and a high consumption level 360. While aspects of the present disclosure may indicate three consumption levels, one skilled in the art will recognize that other or additional levels may be implements, including a raw utilization percentage for each node (as opposed to grouping the nodes by lowest, average, and/or high).

According to one aspect, node utilization data may be collected periodically and used to forecast potential utilization of the nodes at a future point in time. According to one aspect, node utilization data may be or include CPU utilization data for each node as well as network utilization data, such as RDF network latency data. According to one aspect, forecasted utilization data may be generated using one or more time series analysis models, such as an autoregressive integrated moving average (ARIMA) model. The time-series forecasting of the CPU cycle utilization for each node of the arrays (e.g., R1 and R2) and the RDF network latency may be used to identify the over-use or under-use of a node as well as generate a forecasted network latency.

According to one aspect, CPU consumption (cycle utilization) and network latency thresholds may be defined such that if such thresholds are exceeded (or not met), the array may seek and find another node that is underutilized to offload cache replacement tasks. If the predicted conditions, including CPU consumption and network latency as described herein, warrant offloading of cache replacement tasks, array R1 may determine the number of extents to offload, and subsequently identify and select a remote node as a candidate for offloading all or a portion of cache replacement tasks, shown in block 302. According to one aspect, array R1 may identify either a remote node within its own array, as shown by arrow 304, or it may identify a node on a second array (array R2), shown by arrow 308, onto which it may offload operations. In the example shown in FIG. 3, the selected node may be the node forecasted to have a low (or lowest) CPU consumption level, for example Node 1 of array R1 if the identified node is in the same array, or Node 4 if the selected node is in array R2, as those nodes have the lowest CPU consumption forecasted.

According to one aspect, if the identified remote node (e.g., the underutilized node) is in the same array, for example Node 1 of array R1, the array may offload the complete replacement procedure for the remote node to run, shown in block 306. The complete replacement procedure may include offloading all CPU cost and all fabric (network) cost associated with cache replacement to the remote board in array R1. For example, the array R1 may share metadata pages (control slots) with the remote node. The worker thread on the remote node may run an extent search algorithm, such as an LRU search, to create a list of candidate slots. The remote node may send a response back to array R1 with the list of replacement slots. In cases where array R1 shares the control slot with a remote node within R1, the remote node may handle all CPU and fabric operations. As a result, the returned replacement slots will be fully processed and immediately ready for reallocation once placed in a local I/O queue.

According to one aspect, if the identified remote node is not the same array, for example, the remote node is another array, for example Node 1 in array R2, the remote node may run an extent search algorithm, such as an LRU search, on R1's data to identify and send a list of candidate memory slots for array R1 to use, shown in block 310. When the remote board is in array R2, for example, the metadata pages may be packed as a payload and sent to array R2 using unique identifiers such as, for example, an Opcode, world-wide name (WWN), or globally unique identifier (GUID) to mark them as "internal metadata I/O," or the like, rather than host writes.

A worker thread on the remote node of array R2 may run an LRU/extent search algorithm on the received control slots, generating a list of candidate slots. Accordingly, the remote node of array R2 may respond to array R1 with the list of replacement (or candidate) slots, which array R1 may then use for read/write misses, ensuring that the cache system in array R1 does not run out of free slots. Accordingly, by tasking the search and identification of candidate slots to the remote node, a portion of the CPU cost, for example 10%, may be offloaded to the remote node in array R2.

Figure 4:
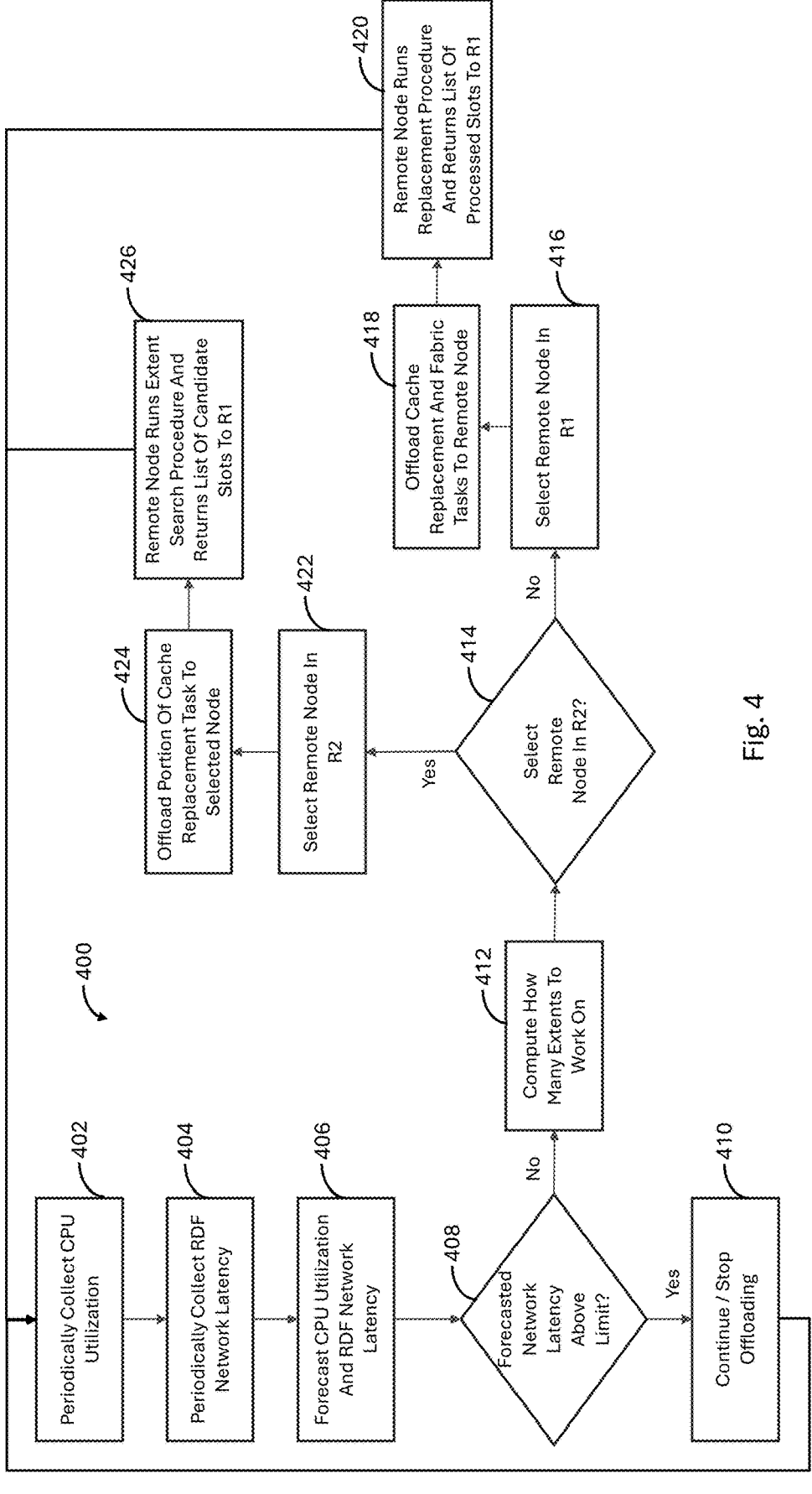
FIG. 4 is a flow diagram of a method for cache replacement task enhancement, according to aspects of the present disclosure.

FIG. 4 is a flow chart of a method 400 of enhancing storage node performance is shown. According to one aspect of the method 400, shown in block 402, a storage array may periodically collect CPU utilization data from one or more nodes in its array as well as nodes in one or more other arrays. Additionally, RDF network latency data may be collected, shown in block 404. The CPU utilization data and the network latency data may be used to forecast future CPU consumption and network latency. According to one aspect, forecasting analysis of the collected data may be done using one or more time series models, such as an ARIMA model, shown in block 406.

According to one aspect, the forecasted network latency may be compared to a predefined threshold, shown in block 408. In one aspect, the predefined threshold may be a 100 millisecond limit. If the forecasted latency is higher than the 100 millisecond limit, then the array may continue processing incoming requests and cache operations according to its normal operation. If the array was currently offloading all or some of its cache replacement tasks, the array can cease offloading operations and return to handling its own cache replacement tasks.

If the forecasted network latency is below the predefined threshold limit, shown in block 412, the array may compute how many storage extents are needed on which to work. As shown in block 414, based on the forecasted CPU consumption of the nodes in the arrays, a selection of either a node in the same array, e.g., array R1, or in a different array, e.g., array R2 may be made. If the selected remote node is not in a second array (array R2), shown in block 416, a node in array R1 may be selected according to its forecasted CPU utilization. Array R1 may offload all cache replacement and fabric tasks to the remote node, as shown in block 418. The remote node may return a list of processed replacement slots to Array R1, shown in block 420.

If the selected remote node is in a separate array, e.g., array R2, shown in block 422, a remote node with a low CPU consumption may be selected. As shown in block 424, a portion of the cache replacement tasks may be offloaded to the remote node. Accordingly, shown in block 426, the remote node may run an extent search procedure, such as an LRU search to find and identify a list of candidate slots. The list of candidate slots may be sent as a response to the array R1.

Figure 5:
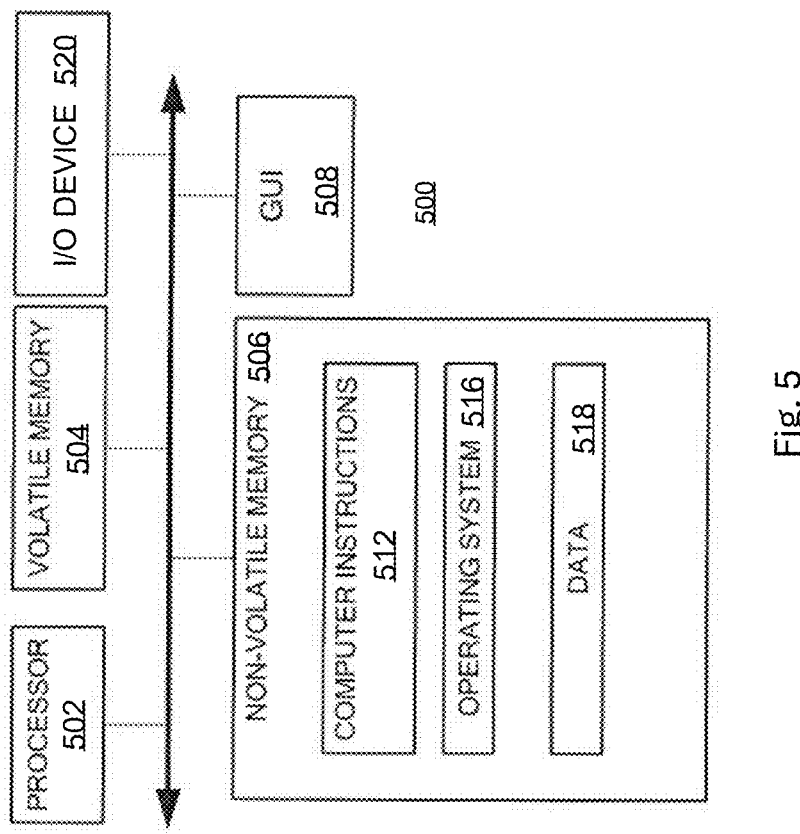
FIG. 5 is a block diagram of a processing device on which methods and processes disclosed herein can be implemented, according to some embodiments of the disclosure.

Referring to FIG. 5, in some embodiments, a computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

As disclosed herein, the concepts, techniques and structures described allow for enhancing local node performance by offloading some or all cache replacement tasks to a remote node. The concepts, techniques and structures described herein provide an advantageous I/O caching system that may improve memory slot allocation by ensuring that free cache slots are always available and preventing miss I/Os from stalling due to cache subsystem overhead. Further, compute resource utilization may be optimized by reducing the load on a first array's compute resources through offloading cache-related tasks to a second array, when applicable, thus improving I/O latency on the first array. Additionally, heavily utilized compute and fabric resources on the first array's local nodes may be freed up by distributing cache work to remote boards within the first array. Further yet, a beneficial distributed workload in which the cache subsystem workload is balanced by offloading to the CPU resources of other connected arrays, utilizing remote direct memory access (RDMA) and fabric hardware for fast and efficient communication.

In some aspects or embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted.

As used in this application, the word "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refers to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods.

Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:
collecting usage data from a plurality of storage devices in one or more storage arrays;
forecasting a network latency based on the usage data of the plurality of storage devices;
determining that the forecasted network latency is below a predefined threshold, and in response:
selecting a remote storage device from the plurality of storage devices;

receiving, at a local storage device of the plurality of storage devices, a list of replacement memory slots from the remote storage device; and
offloading cache replacement tasks from the local storage device to the remote storage device.

2. The method of claim 1 wherein forecasting the network latency includes using a time series analysis model.

3. The method of claim 2 wherein the time series analysis model is an autoregressive integrated moving average (ARIMA) model.

4. The method of claim 1, wherein the local storage device and the remote storage device are within a first storage array.

5. The method of claim 4, further comprising offloading all cache replacement tasks to the remote storage device, wherein the list of replacement memory slots includes processed slots.

6. The method of claim 4, wherein the cache replacement tasks include fabric operations.

7. The method of claim 1, wherein the local storage device is within a first storage array and the remote storage device is within a second storage array.

8. The method of claim 7, wherein offloading the cache replacement tasks includes offloading a portion of the cache replacement tasks and the list of replacement memory slots includes a list of candidate replacement slots.

9. The method of claim 1, wherein a list of replacement memory slots is generated by a least recently used search.

10. The method of claim 1, further comprising transmitting metadata pages to the remote storage device.

11. A system comprising:
a memory; and
a processor configured to perform the operations of:
collecting usage data from a plurality of storage devices in one or more storage arrays;
forecasting a network latency based on the usage data of the plurality of storage devices;
determining that the forecasted network latency is below a predefined threshold, and in response:
selecting a remote storage device from the plurality of storage devices;
receiving, at a local storage device of the plurality of storage devices, a list of replacement memory slots from the remote storage device; and
offloading cache replacement tasks from the local storage device to the remote storage device.

12. The system of claim 11, wherein the local storage device and the remote storage device are within a first storage array.

13. The system of claim 12, further comprising offloading all cache replacement tasks to the remote storage device, wherein the list of replacement memory slots includes processed slots.

14. The system of claim 12, wherein the cache replacement tasks include fabric operations.

15. The system of claim 11, wherein the local storage device is within a first storage array and the remote storage device is within a second storage array.

16. The system of claim 15, wherein offloading the cache replacement tasks includes offloading a portion of the cache replacement tasks and the list of replacement memory slots includes a list of candidate replacement slots.

17. The system of claim 11, wherein a list of replacement memory slots is generated by a least recently used search.

18. The system of claim 11, further comprising transmitting metadata pages to the remote storage device.

19. A non-transitory computer-readable medium storing one or more processor-executable instructions, which when executed by a processing circuitry, further cause the processing circuitry to perform the operations of:

collecting usage data from a plurality of storage devices in one or more storage arrays;

forecasting a network latency based on the usage data of the plurality of storage devices;

determining that the forecasted network latency is below a predefined threshold, and in response:

selecting a remote storage device from the plurality of storage devices;

receiving, at a local storage device of the plurality of storage devices, a list of replacement memory slots from the remote storage device; and offloading cache replacement tasks from the local storage device to the remote storage device.

20. The non-transitory computer-readable medium of claim 19 wherein the list of replacement memory slots from the remote storage device is generated by a least recently used search and metadata pages are transmitted to the remote storage device.

* * * * *